US010339962B2

(12) United States Patent
Thiagarajan et al.

(10) Patent No.: US 10,339,962 B2
(45) Date of Patent: Jul. 2, 2019

(54) METHODS AND APPARATUS FOR LOW COST VOICE ACTIVITY DETECTOR

(71) Applicant: Texas Instruments Incorporated, Dallas, TX (US)

(72) Inventors: Ganesan Thiagarajan, Bangalore (IN); Tarkesh Pande, Richardson, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/485,165

(22) Filed: Apr. 11, 2017

(65) Prior Publication Data

US 2018/0293998 A1    Oct. 11, 2018

(51) Int. Cl.
| | | |
|---|---|---|
| *G10L 25/84* | (2013.01) | |
| *G10L 25/21* | (2013.01) | |
| *G10L 25/09* | (2013.01) | |
| *G10L 25/78* | (2013.01) | |
| *G10L 15/00* | (2013.01) | |

(52) U.S. Cl.
CPC ............ *G10L 25/84* (2013.01); *G10L 25/09* (2013.01); *G10L 25/21* (2013.01); *G10L 15/00* (2013.01); *G10L 2025/783* (2013.01)

(58) Field of Classification Search
CPC ..................................................... G10L 15/00
USPC ................................................. 704/E15.001
See application file for complete search history.

(56) References Cited

U.S. PATENT DOCUMENTS

| | | | | |
|---|---|---|---|---|
| 5,410,632 A | * | 4/1995 | Hong | G10L 25/78 704/201 |
| 5,963,901 A | * | 10/1999 | Vahatalo | G10L 21/0208 704/218 |
| 6,615,170 B1 | * | 9/2003 | Liu | G10L 25/78 704/231 |
| 7,596,496 B2 | * | 9/2009 | Jabloun | G10L 25/78 704/226 |
| 9,368,112 B2 | * | 6/2016 | Wang | G10L 25/78 |
| 2006/0217973 A1 | * | 9/2006 | Gao | G10L 25/78 704/221 |
| 2006/0253283 A1 | * | 11/2006 | Jabloun | G10L 25/78 704/233 |

(Continued)

OTHER PUBLICATIONS

J. Ramirez, J.M. Gorriz and J.C. Segura, "Voice Activity Detection. Fundamentals and Speech Recognition System Robustness," Chapter 1 in "Robust Recognition and Understanding," Jun. 2007, pp. 1-23, I-Tech, Vienna, Austria, ISBN—978-3-902613-08-0; accessed Apr. 11, 2017: http://cdn.intechweb.org/pdfs/104.pdf.

*Primary Examiner* — Feng-Tzer Tzeng
(74) *Attorney, Agent, or Firm* — Michael A. Davis, Jr.; Charles A. Brill; Frank D. Cimino (57) ABSTRACT

In described examples, a method for detecting voice activity includes: receiving a first input signal containing noise; sampling the first input signal to form noise samples; determining a first value corresponding to the noise samples; subsequently receiving a second input signal; sampling the second input signal to form second signal samples; determining a second value corresponding to the second signal samples; forming a ratio of the second value to the first value; comparing the ratio to a predetermined threshold value; and responsive to the comparing, indicating whether voice activity is detected in the second input signal.

26 Claims, 7 Drawing Sheets

(56) References Cited

U.S. PATENT DOCUMENTS

| | | | |
|---|---|---|---|
| 2008/0300875 A1* | 12/2008 | Yao | G10L 15/065 |
| | | | 704/236 |
| 2012/0232896 A1* | 9/2012 | Taleb | G10L 25/78 |
| | | | 704/233 |
| 2013/0191117 A1* | 7/2013 | Atti | G10L 25/84 |
| | | | 704/226 |
| 2014/0214418 A1* | 7/2014 | Nakadai | G10L 21/0216 |
| | | | 704/233 |
| 2014/0348345 A1 | 11/2014 | Furst et al. | |

* cited by examiner

METHODS AND APPARATUS FOR LOW COST VOICE ACTIVITY DETECTOR

TECHNICAL FIELD

This disclosure relates generally to voice activity detection and more particularly to voice activity detection with low cost and low power voice activity tests.

BACKGROUND

Products that use hands-free voice activated technology to implement a spoken user interface are used for a variety of functions. Examples include: switching lights on and off; dimming lights; playing music; finding songs in a play list; searching the internet; finding names in a phone list; and; dialing phones. There are some applications where the hands free technology is very important, such as having dimmable lights in an operating room, or having a phone that allows an operator to communicate while keeping both hands on the wheel while driving a car or controlling an airplane. Some products use power from an AC supply, while many are battery powered, most notably smart phones. In battery powered applications, keeping power usage low improves battery life. Automotive and vehicle based systems also require low power.

Speech recognition (SR) is used to decipher the user's spoken input into the various commands that are available for a device. SR can be implemented in software, hardware, or a combination of both. SR is power intensive in any case. To conserve power, voice activity detection (VAD) (sometimes "speech activity detection") is used. In one approach, VAD keeps the SR function in a "sleep mode" when there are no voice commands. When voice activity is detected, the system performs a VAD trigger to wake up the SR process. In an SR application using VAD, power is conserved because the power intensive computations needed for SR are not performed on noise or during no signal conditions at the input. VAD is a useful technology in conserving power in SR systems, however the effectiveness of a VAD system is related to how well it can detect real voice activity at the input, how quickly it responds to voice activity at the input, and at what power levels.

Some existing VAD solutions include simple energy detection systems which consume lower power, but which are susceptible to reacting to noise, resulting in higher rates of false alarms. More computational intensive VAD systems based on the HMM (hidden Markov model) have improved voice detection and noise rejection, but use elaborate computation which is power intensive. Other VAD system use neural nets or classifiers which improve upon the false detection rates of energy detectors, but which have an extensive calibration process and use more power. A low power and low cost VAD system with low false detection rate is needed.

SUMMARY

In described examples, a method for detecting voice activity includes: receiving a first input signal containing noise; sampling the first input signal to form noise samples; determining a first value corresponding to the noise samples; subsequently receiving a second input signal; sampling the second input signal to form second signal samples; determining a second value corresponding to the second signal samples; forming a ratio of the second value to the first value; comparing the ratio to a predetermined threshold value; and responsive to the comparing, indicating whether voice activity is detected in the second input signal.

DETAILED DESCRIPTION

Corresponding numerals and symbols in the different figures generally refer to corresponding parts unless otherwise indicated. The figures are not necessarily drawn to scale. The term "coupled" may include connections made with intervening elements, and additional elements and various connections may exist between any elements that are "coupled."

Figure 1:
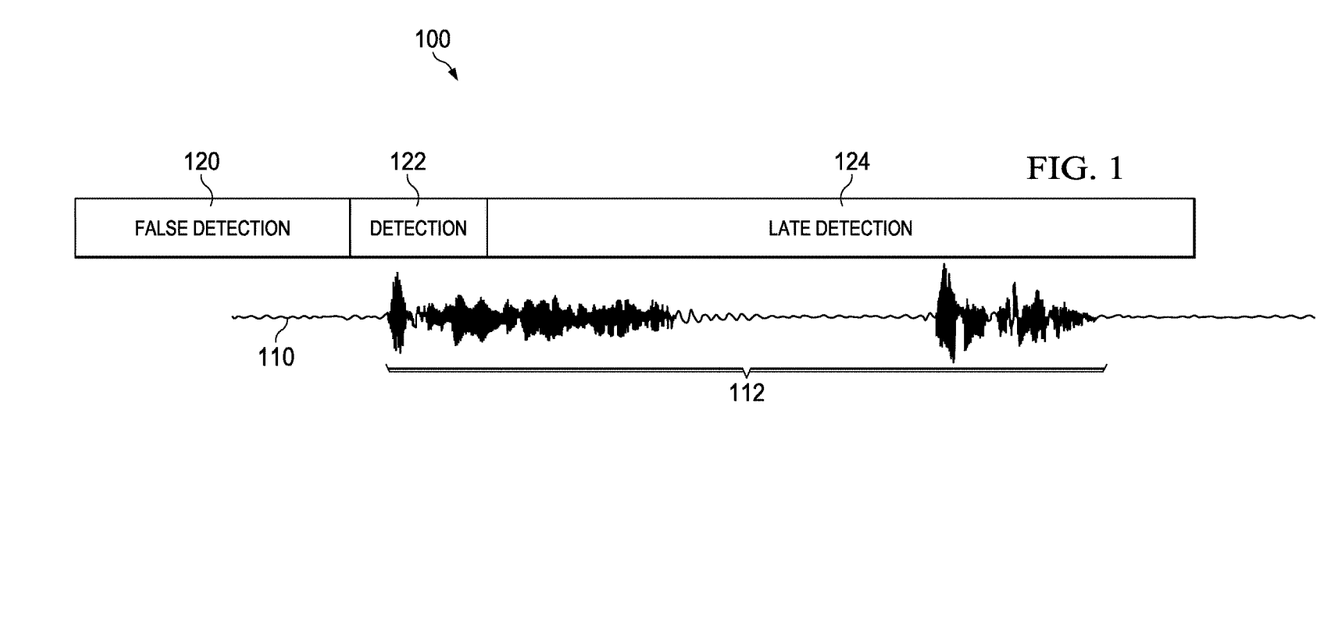
FIG. 1 is a graph showing a voice input and related VAD timing.

FIG. 1 shows in graph 100 a voice input and the corresponding VAD timing. Graph 100 illustrates voice data 110 with amplitude in the y-axis and time in the x-axis. Three consecutive detection regions are shown above the voice data 110. The first region in time is the False Detection region 120, and it occurs before the voice data shown as 112 begins in signal 110. The second region is the Detection region 122 and it follows the end of the False Detection region 120. Region 124 is the Late Detection region and this occurs after the Detection region 122.

VAD systems that trigger indicating voice activity in the False Detection region 120 use excessive power, since the power intensive SR process (not shown) is activated needlessly. VAD systems that trigger indicating voice activity in the Late Detection region 124 are subject to errors, including possibly missing the beginning of the voice input. Systems that trigger in the Late Detection region 124 generally require the user to repeat at least the first voice command. Ideally, the VAD system will trigger indicating voice activity in the Detection region 122, which turns on SR when actual voice commands are present and also turns on SR when enough of the command is captured so that the SR can properly identify the voice command. The VAD system should also be intelligent enough that it triggers on "speech-like" signals. Noise at the input should not be identified as voice activity. When there is a change in energy, as is observed when there are glitches, clicks or pops at the input, the VAD should not trigger. If the VAD triggers when there is a click or pop and the power intensive SR process starts, this is another type of False Detection.

SR systems with analog front ends (AFEs) that provide analog samples coupled to a fast Fourier transform (FFT) engine offer great flexibility and capability for implementing various speech detection and VAD. However, the power required to perform the computations used in these solutions is considerable and the physical area to layout this hardware implementation in a semiconductor device is also large.

An example embodiment includes a simplified method and apparatus for a VAD system that will enable a simplified and low power front end to detect voice activity.

In the following example embodiment, the mathematical formula for a likelihood ratio test (LRT) is simplified for a low power VAD system. In the embodiment low power VAD, the signal-to-noise ratio (SNR) can be used as the VAD trigger and achieve low false alarm rates.

Human speech can be modeled as a Laplacian distribution, and a log likelihood ratio (LLR) is shown in EQ. 1.

$$LLR \approx \frac{1}{2}\log\frac{\pi}{2} - 2\left(\frac{N}{2} - 1\right)\log b - \left(\frac{N}{2} - 2\right)\log(y^T Rss^{-1}y) + \log|Rxx|^{1/2} + \left(\frac{y^T[b^2 Rxx^{-1} - 2Rss^{-1}]y}{2b^2}\right) \quad (1)$$

where $Rxx^{-1}$ is the inverse covariance matrix of the noise samples, and Rss is the covariance matrix of the signal samples.

EQ. 1 is complicated and requires power intensive hardware operations to compute. Instead, by using a folded Gaussian distribution to model the speech, a simplified LLR calculation can be formed for use in an embodiment, as shown in EQ. 2:

$$LLR \cong \frac{1}{2}\log|I + Rxx^{-1}Rss| > \text{Threshold} \quad (2)$$

where I is the identity matrix, $Rxx^{-1}$ is the inverse covariance matrix of the noise samples, and Rss is the covariance matrix of the signal plus noise samples.

Calculating EQ. 2 requires much less computing than EQ. 1, resulting in much less power consumption in a hardware device or system using software to perform the LLR calculations.

Figure 2:
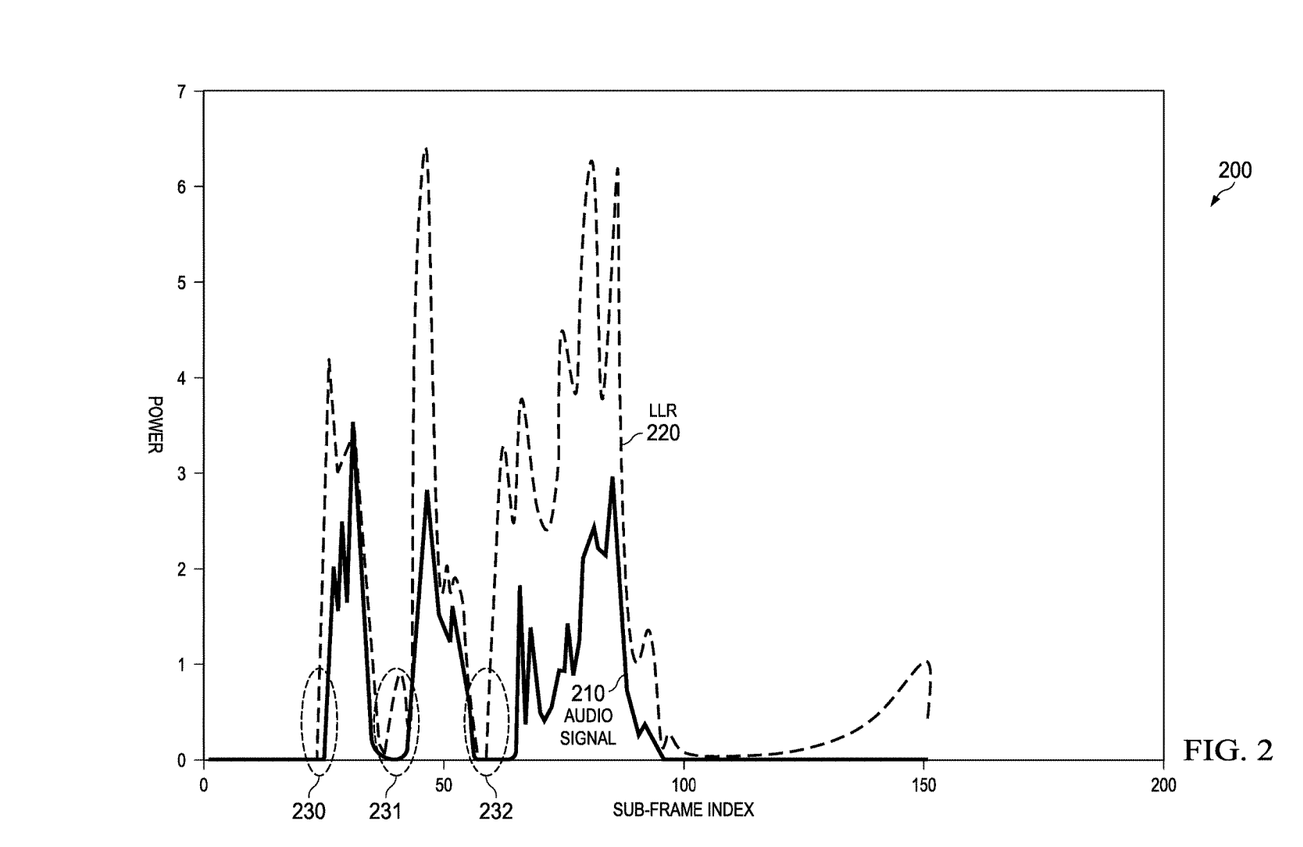
FIG. 2 is a graph comparing a simplified log likelihood ratio (LLR) calculation of an embodiment and audio power.

A comparison of the simplified LLR calculation to a sample speech signal confirms that the simplified LLR calculation of EQ. 2 is effective. FIG. 2 is a graph of the simplified LLR calculation and the audio signal used in an example system. In graph 200, the vertical axis is POWER with increasing magnitude moving upwards away from the origin, the horizontal axis is SUB-FRAME INDEX with increasing magnitude to the right of the origin. Audio Signal 210 is a speech sample. LLR 220 is the simulated LLR computed from the power in Audio Signal 210 using the calculation in EQ. 2.

The simplified LLR from EQ. 2 is not intended to model human speech, but instead is used in the embodiments to detect the presence of speech for a VAD system. In FIG. 2, the tracking of the LLR graph 220 with Audio Signal 210 confirms that the simplified LLR in EQ. 2 will work for a VAD system. As shown in FIG. 2 in regions 230, 231 and 232, the rising edge of the LLR response does not lag the actual energy response in the audio signal, enabling a timely VAD trigger.

For ultra-low power applications, an even lower power VAD approach is desired. In another embodiment, a VAD trigger signal is formed using a calculation that represents the signal-to-noise ratio (SNR), yet uses the relatively low power computation processes of addition and division. The audio signal received will always contain either noise (X) or signal and noise (S+X). Differentiating between when the signal contains only noise and when the signal contains the combination of noise and voice allows a ratio of the two states to be computed. The resulting ratio is proportional to the SNR. Using the ratio, a VAD trigger can be output once a threshold ($T_v$) is exceeded. Alternatively, a no voice detected (NVD) signal can be output when the ratio is beneath a threshold. Using EQ. 3 to compute the sum of the noise (null hypothesis $H_0$) and using EQ. 4 to compute the sum of the signal plus noise (alternate hypothesis $H_1$), the computations are performed with the addition operation (which is a low power operation):

$$H_0: Z(N) = \sum_{n=1}^{N} |X(n)| \quad (3)$$

$$H_1: Z(N) = \sum_{n=1}^{N} |S(n) + X(n)| \quad (4)$$

where X(n) is the noise of sample n, S(n) is the signal of sample n, and Z(N) is a random variable.

A ratio ($M_R$) can be computed and compared to a threshold value ($T_V$) as shown in EQ. 5. By a comparison to a threshold, $M_R$ can be used to create a VAD trigger.

$$M_R = \frac{\hat{\mu}_Z(H_1)}{\hat{\mu}_Z(H_0)} \overset{H_1}{\underset{H_0}{\gtrless}} T_V \quad (5)$$

where $\hat{\mu}_Z(H_1)$ is the mean of Z(N) under $H_1$, $\hat{\mu}_Z(H_0)$ is the mean of Z(N) under $H_0$, and $T_V$ is a threshold value. Note that as indicated in EQ. 5, the threshold $T_V$ can be arranged so the inequality is to determine if $M_R$ is greater than the threshold indicating voice, or to determine if $M_R$ is less than a threshold indicating no voice detected (or only noise) in the sampled signal.

The mean ratio $M_R$ of EQ. 5 is not the true SNR, but a representation of it. The $M_R$ of EQ. 5 can be calculated without the need of performing square roots or square calculations, which are computationally intensive and thus require significant power and computing resources. EQ. 6 shows the relationship between the mean ratio $M_R$ of EQ. 5 and the SNR.

$$\frac{\hat{\mu}_Z(H_1)}{\hat{\mu}_Z(H_0)} = \sqrt{1 + \frac{\sigma_s^2}{\sigma_x^2}} = \sqrt{1 + SNR} \quad (6)$$

Where $\sigma_s^2$ is the signal plus noise variance, $\sigma_x^2$ is the noise variance.

The two terms at the right hand side of EQ. 6 are not computed in the embodiments, but are presented here as an illustration to show the relationship of the SNR to the mean ratio $M_R$ of EQ. 5. In an embodiment VAD system using EQ. 5, when the computed mean ratio $M_R$ is equal or greater than the threshold $T_V$, the signal is considered likely to contain voice, resulting in a VAD trigger. In contrast, when the $M_R$ is less than threshold $T_V$, the signal is considered to be only noise.

Figure 3:
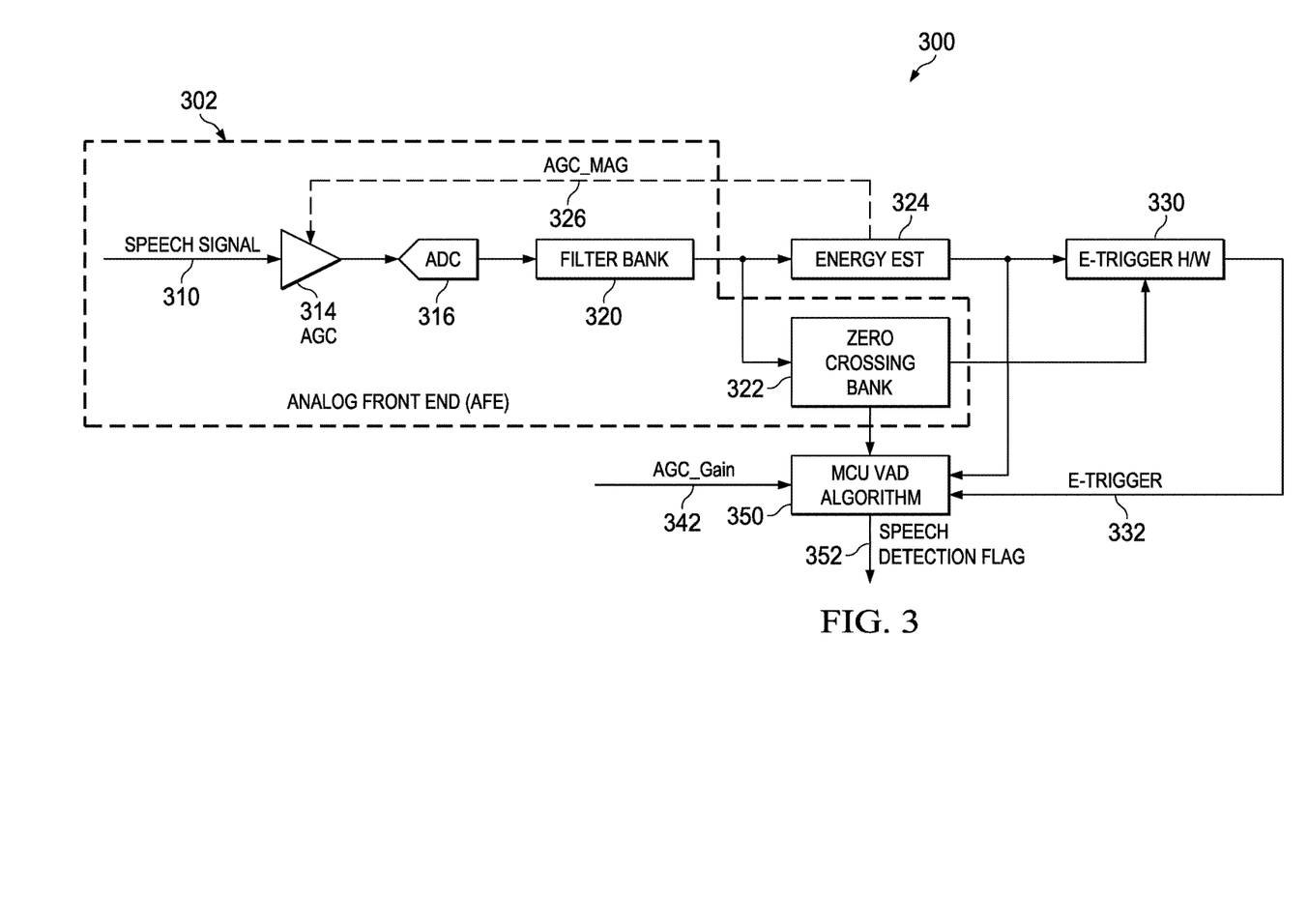
FIG. 3 is a block diagram of a system incorporating a low power VAD system embodiment.

FIG. 3 is a block diagram of an embodiment for a system with a low power VAD analog front end. Components within area 302 form a low power analog front end (AFE) for the speech recognition system 300. System 300 has a speech signal input 310 coupled to an automatic gain control (AGC) block 314, which is then coupled to analog-to-digital converter (ADC) block 316. ADC block 316 is coupled to filter bank 320. The AGC block 314 has an input for gain control AGC_MAG. The AGC_MAG signal is adjusted to keep the signal magnitudes within the proper range for the ADC block 316. As is described hereinbelow, the magnitude of the signal AGC_Gain which corresponds to the AGC Mag signal can be observed in some embodiments to indicate the likelihood voice is present in the samples of a signal at the input, when the signal AGC_Gain is decreasing over time, this indicates it is likely speech is present in the input signal. Filter bank 320 is coupled to an energy estimator (ENERGY EST) 324 and a zero crossing bank 322. ENERGY EST. 324 and zero crossing bank 322 have outputs coupled to the E-TRIGGER H/W block 330. Zero crossing bank 322 and E-TRIGGER H/W block 330 have outputs coupled to the MCU VAD ALGORITHM 350. The MCU VAD ALGORITHM 350 also receives the signal AGC_Gain 342. In an example embodiment AGC_Gain 342 can be the same as AGC_MAG 326, while in other embodiments it can be another signal corresponding to changes in the AGC_MAG signal. MCU VAD Algorithm 350 outputs SPEECH DETECTION FLAG 352. Speech detection flag 352 indicates VAD (voice activity detection) when true and NVD (no voice detected) when false.

The analog front end AFE 302 of FIG. 3 includes the filter bank 320 and zero crossing back 322. As is further described hereinbelow, portions of these functions can be implemented after the ADC 316 and thus these circuits can be considered digital circuits. However, because these functions are close to the input for analog input signal speech signal 310, these functions are considered part of the AFE.

Note also that while in FIG. 3, block 350 is shown as an MCU VAD algorithm that could be performed by an microcontroller unit (MCU), in alternative embodiments the MCU VAD Algorithm 350 can be performed using software executed on any programmable processor, microprocessor unit (MPU), central processor unit (CPU), or by use of dedicated hardware, including by other types of processors such as digital signal processors (DSPs) mixed signal processors (MSPs), reduced instruction set computer cores (RISC cores), advanced RISC machine cores (ARM cores), or by use of user definable integrated circuits such as field programmable gate arrays (FPGAs) and complex programmable logic devices (CPLDs). System on a chip (SoC) devices can also be used. A dedicated state machine can be used with the states defined as described further hereinbelow.

Implementations of the example embodiment of FIG. 3 can be formed on a single monolithic integrated circuit, or as a module or board using more than one integrated circuit. A processor integrated circuit can perform the MCU VAD Algorithm. The analog front end (AFE) 302 can be implemented as a monolithic integrated circuit. Additional integrated circuits can form the energy estimator 324, the E-Trigger H/W 330. In an example arrangement, the analog front end AFE 302 can form a single monolithic integrated circuit and the remaining blocks 350, 324, 330 can be formed by a digital integrated circuit that includes a processor for performing the VAD Algorithm in 350. Discrete or off-the-shelf components such as an analog to digital converter, programmable filter, and programmable digital integrated circuits such as DSPs and MSPs can be used on a board or module to form system 300.

In operation, the system block 300 receives as an input speech signal 310 that can contain speech, or that can contain noise and speech. The signal 310 can also contain only noise when no speech is present. Speech signal 310 is amplified in the AGC block 314 and then coupled to the ADC 316, where it is digitized. The output of the ADC 316 is coupled to filter bank 320. Filter bank 320 sorts the input signal into various frequencies and determines the magnitude of the signal.

The output of the filter bank 320 is coupled to the energy estimator 324 and the zero crossing bank 322. The energy estimator 324 comprehends the signal power and sets the AGC magnitude (AGC_Mag) 326 for the AGC block 314. AGC_MAG 326 is used to maintain the amplitude of the input signal within an operative range of the ADC in block 316. The energy estimator 324 also outputs signal power information to the E-TRIGGER H/W 330 and the MCU 350. The zero crossing bank 322 sums the amount of zero crossings for select frequencies. The zero crossing bank 322 has outputs coupled to the E-trigger H/W block 330 and to the MCU 350. The E-TRIGGER H/W block 330 is a programmable threshold device that uses combinations of filter bank outputs sampled at various time intervals to compute and output E-TRIGGER signal 332. E-TRIGGER signal 332 is coupled to the MCU VAD Algorithm 350. At 350, information from the AGC_Gain 342, zero crossing bank 322, energy estimator 324 and E-trigger 332 are used with a VAD algorithm performed within the MCU VAD ALGORITHM 350. When a voice threshold is met or exceeded, the speech detection flag 352 is true (indicating VAD), otherwise the speech detection flag is false (indicating NVD). An expanded review of the low power components within AFE 302 is further described.

Figure 4:
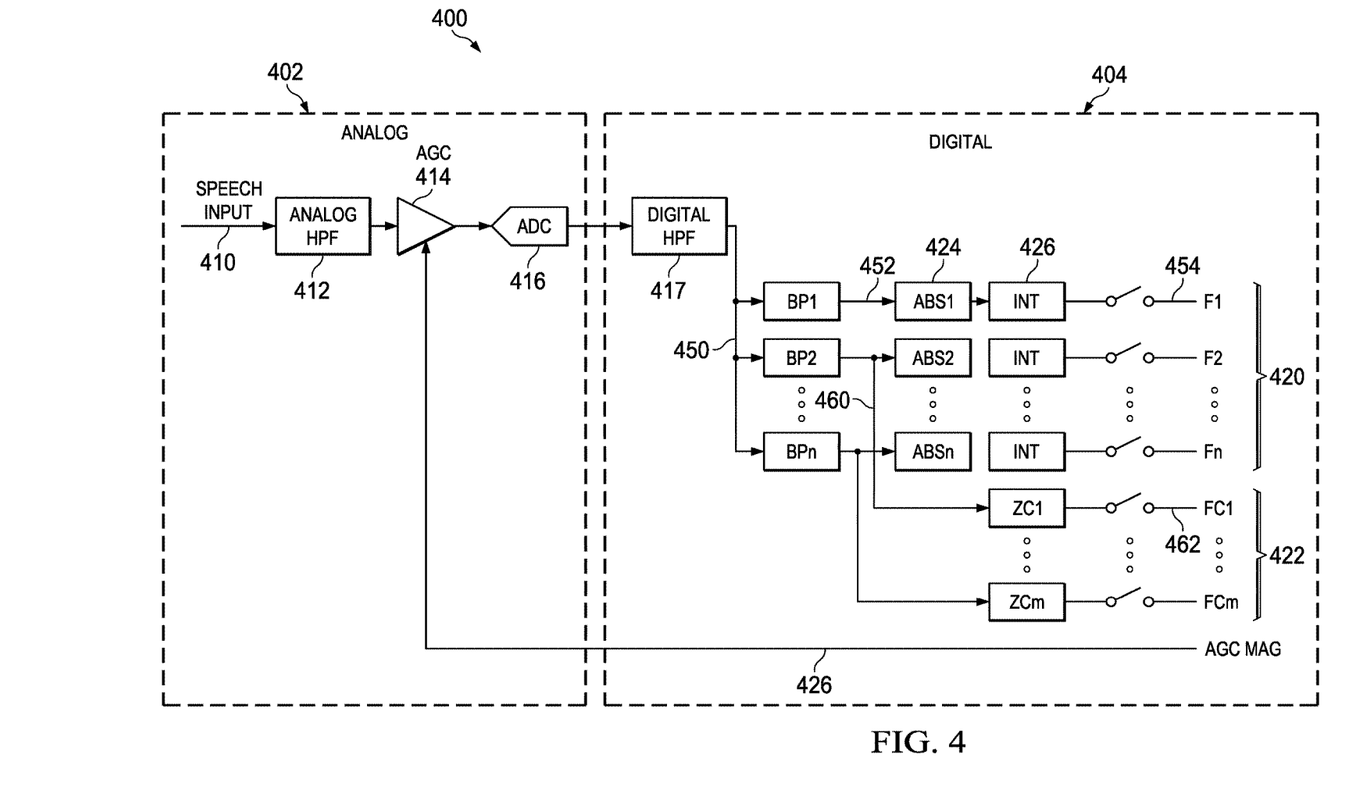
FIG. 4 is an expanded block diagram of a VAD front end of the embodiments.

FIG. 4 is an expanded block diagram of a low power VAD front end for use with the embodiments. Low power VAD front end 400 is implemented with both analog and digital circuitry and contains at least a speech input 410 coupled to an analog high pass filter (ANALOG HPF) 412. The output of ANALOG HPF 412 is coupled to an automatic gain control (AGC) circuit 414. AGC 414 has a second input for gain magnitude (AGC_MAG) 426. The output of AGC 414 is coupled to ADC 416 and the ADC 416 is coupled to a digital high pass filter (DIGITAL HPF) 417. The ADC 416 converts the analog signal to a digital signal. The output of DIGITAL HPF 417 is coupled to a filter bank containing a set of filter branches 420, ranging from one through n, each filter branch having a bandpass filter (BP1-BPn), absolute value (ABS1-ABSn) block, integration (INT) block and a sampling switch (F1-Fn). A selected number of frequencies taken from the band pass filters BP1-BPn are coupled to zero crossing blocks 422 ranging from one to m, each zero crossing block having a zero crossing detector (ZC1-ZCm) and a sampling switch (FC1-FCm). In this example embodiment, the speech signal 410, ANALOG HPF 412, AGC 414 and ADC 416 are implemented in an analog technology and are shown within the ANALOG 402 area. In this embodiment, the DIGITAL HPF 416, the filter branches 420 and zero crossing registers 422 are implemented in digital technology and are shown within the DIGITAL 404 area.

In operation, the speech input 410 is coupled to ANALOG HPF 412 where frequencies of interest are coupled to the analog gain circuit AGC 414. The AGC 414 amplifies the input signal to the appropriate amplitude for the ADC 416. The gain of AGC 414 is adjusted based on the input signal AGC_Mag 426. The analog output of AGC 414 is digitized in ADC 416 and then further filtered by DIGITAL HPF 417 to pass frequencies of interest. The digitized output of the DIGITAL HPF 417 is coupled to the filter branches 420, each branch containing a band pass filter (BP1-BPn) corresponding to a frequency range of interest. Signals passing through the band pass filter (BPn) are coupled to absolute value (ABS1-ABSn), integration (INT) block and a sampling switch (F1-Fn).

Describing the first branch with output switch F1, the digital output signal 450 from the DIGITAL HPF 417 is processed through a band pass filter BP1 emerging as filtered digital signal 452. The digital filtered signal 452 is processed through an absolute value block ABS1 424, and through an integrator INT 426 and a sampling switch F1 emerging as digital signal 454 representing the first frequencies of interest. In an example embodiment, these frequencies can be from zero hertz through five hundred hertz. The subsequent filter branches (BP2-BPn), corresponding to output signals (F2-Fn), have the same functional arrangement, with the band pass filters BPn arranged for a different frequencies of interest, such as five hundred hertz through one kilohertz, one kilohertz through four kilohertz and four kilohertz through twelve kilohertz. Other frequency bands can be used to form alternative embodiments.

A set of zero crossing detector branches 422 (ZC1-ZCm) are also arranged to accept the output signals of select band pass filters BPn from the filter branches 420, such as the even band pass filters BP2, BP4, BP6 and so on. Describing the first zero crossing filter branch with output switch FC1, the bandpass filter BP2 outputs digital signal 460 which is processed through zero crossing detector ZC1 with the output of ZC1 then passing through output switch FC1 emerging as data signal 462. The subsequent zero crossing detector branches, corresponding to output signals (FC2-FCn), have the same functional arrangement operating on digital output from other selected band pass filters BP2-BPn.

In another embodiment, a state machine is configured to effectively use a low power VAD by implementing at least some of EQs. 2 through EQ. 5. The state machine will minimize false detections, have a fast response to voice activity, and have low power consumption.

Figure 5:
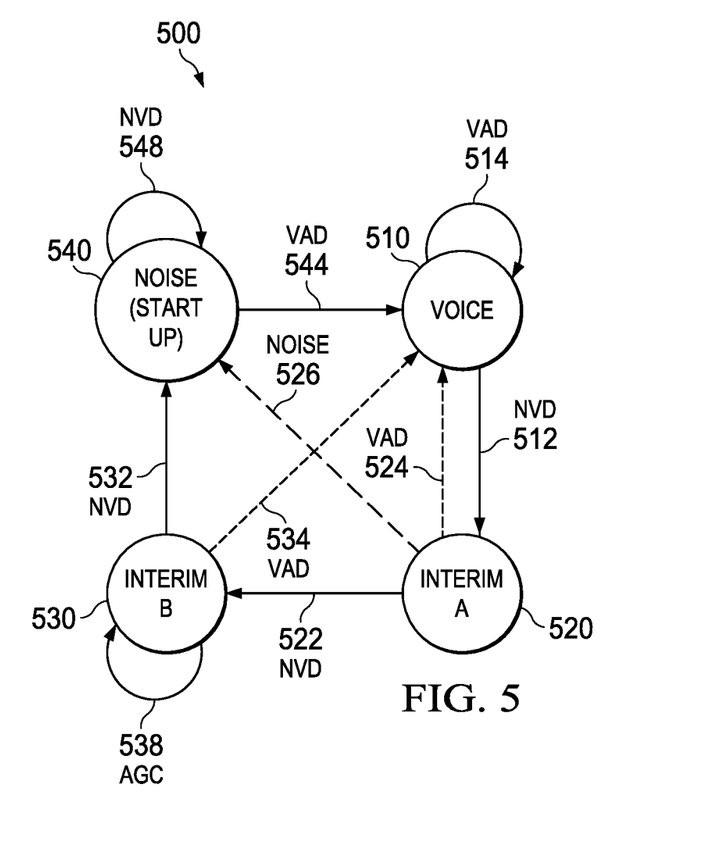
FIG. 5 is a state machine diagram for a low power VAD system of the embodiments.

FIG. 5 is an example embodiment of a state machine diagram for a low power VAD system. Example state machine 500 includes four states: Voice 510; Interim A 520; Interim B 530; and Noise 540. In alternative embodiments, additional states could be added. The Noise state 540 is shown larger in FIG. 5, indicating that the time spent there is greater than the time spent in the other states. The Noise state 540 is used to calculate the noise components of EQ. 2 and/or EQ. 3 so that the computation for a ratio, either log likelihood ratio (LLR) or mean ratio $M_R$, have the correct noise component when calculated. For the LLR test, the noise component is the matrix $R_{XX}^{-1}$ from EQ. 2. For the $M_R$ test, the noise component is the mean of $H_0$ from EQ. 3. In this example, two interim states Interim A, 520, and Interim B, 530, are used to help ensure that only noise is captured in the state Noise, 540. In alternative example embodiments the state machine diagrams may have only a single interim state or can have multiple interim states.

The state Voice 510 has an exit NVD 512 to the state Interim A 520 and three entry paths: 544; 534; and 524. Entry VAD 544 comes from state Noise 540, entry VAD 534 comes from state Interim B 530 and VAD 524 comes from state Voice 510. A VAD loop 514 starts and ends in state Voice 510. State Interim A 520 has an entry NVD 512 from state Voice 510 and three exit paths: 522; 524; and 526. Exit NVD 522 goes to state Interim B 530, exit NOISE 526 goes to state Noise 540 and exit VAD 524 goes to state Voice 510. State Interim B 530 has a single entry NVD 522 from state Interim A 520 and two exits: 532 and 534. Exit NVD 532 goes to state Noise 540 and exit VAD 534 goes to state Voice 510. State Noise 540 has an exit VAD 544 that goes to state Voice 510 and two entries: entry NVD 532 from state Interim B 530; and entry NOISE 526 from state Interim A 520. State Interim B 530 has an AGC loop 538 and state Noise 540 has a NVD loop 548.

In operation, the state machine 500 begins operation in state Noise 540 with the assumption that no voice commands are being given at start up (as indicated in FIG. 5 by the label (START UP). A stored value of $H_1$ is initialized to equal the first computed value of $H_0$. EQ. 5 and EQ. 2 are the low power equations used for VAD and either, or both, could be used for VAD in the state machine 500. In this example embodiment, the $M_R$ (mean ratio) of EQ. 5 will be used in the VAD trigger evaluation. In other embodiments, the LLR (log likelihood ratio) of EQ. 2 can be used.

When the Noise state 540 is active, the component $H_0$ from EQ. 5 is computed and stored to keep the noise component of the $M_R$ calculation updated. $M_R$ is computed using the last stored value of $H_1$ along with the current value of $H_0$. When no voice is detected (NVD) the processing cycles through NVD loop 548. After returning from NVD loop 548, the Noise state 540 remains active, and $H_0$ is computed and $M_R$ is updated and stored for each cycle until a VAD event causes the state machine to transition from the Noise state 540 to the Voice state 510 through branch VAD 544. In various embodiments, the VAD is a function of the $M_R$, AGC level and zero crossing (ZC). In other examples where EQ. 2 is used in place of EQ. 5, the VAD trigger is a function of LLR, AGC level and ZC.

When the state Voice 510 becomes active, $H_1$ of EQ. 5 will be computed and stored. While VAD is true, the processing proceeds through VAD loop 514. After returning from the VAD loop 514, the state Voice 510 remains active and continues to calculate and store $H_1$ until a no voice detected (NVD) signal causes the state machine to transition from the state Voice 510 to the state Interim A 520 through branch 512 (NVD). The NVD signal is a function of the $M_R$, AGC level and zero crossing (ZC).

When the state Interim A 520 becomes active, $H_1$ from EQ. 3 is updated and stored and the $M_R$ is again calculated. Because speech has pauses in it, in the event of a VAD detection, the Interim A state 520 can rapidly return to the Voice state 510 through branch 524 (VAD). The VAD is based on the $M_R$, AGC and ZC. If noise is detected, then the active state changes directly to Noise 540 through branch 526 (NOISE). If an NVD signal occurs in the Interim A state 520, then the state machine transition to Interim B state 530 through branch 522 NVD. In an alternative arrangement, state Interim B can be omitted. In another alternative arrangement, additional interim states could be used.

When the Interim B state 530 becomes active, $H_1$ from EQ. 3 is updated and stored and the mean ratio $M_R$ is calculated. If a voice activity occurs, then the state Voice 510 becomes the active state through branch VAD 534. The VAD signal trigger is based on the $M_R$, AGC and ZC. If no VAD signal triggers, then the AGC loop 538 is entered if the AGC is steady as indicated by the signal AGC_Gain, otherwise if the AGC gain is increasing, then the state Noise 540 becomes the active state through branch 532 (NVD.)

To further clarify the operation of the four states, flow additional flow charts showing the detailed operations that can be performed in example arrangements of the four states will show an example of how the processing can flow within each state.

Figure 6:
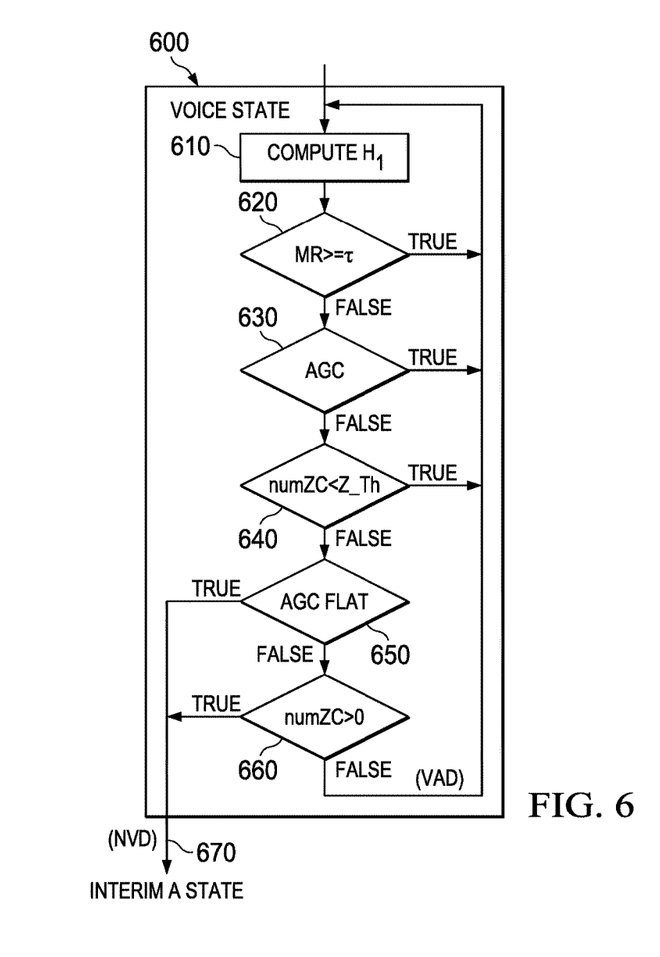
FIG. 6 is a flow chart of a Voice State for use with the embodiments.

FIG. 6 is a flow chart of the processes performed in a state for voice processing such as state Voice 510 in FIG. 5. Flow chart 600 is an example embodiment for a voice state that contains at least a compute block 610, five decision blocks 620, 630, 640, 650, 660, and an exit block 670. Compute block 610 is coupled to decision block 620. Decision block 620 true is coupled to compute block 610. Decision block 620 false is coupled to decision block 630. Decision block 630 true is coupled to back to compute block 610. Decision block 630 false is coupled to decision block 640. Decision block 640 true is coupled to back to compute block 610. Decision 640 false is coupled to decision blocks 650 and 660. Decision 650 true is coupled to the exit, state Interim A 670. Decision 650 false is coupled to compute block 610. Decision 660 true is coupled to the exit, to the state Interim A 670. Decision 660 false is coupled to compute block 610.

In operation, compute block 610 computes and stores the sum $H_1$ of EQ. 4 so that the $H_1$ value used in the mean ratio $M_R$ test in decision block 620 is updated. In decision block 620, the $M_R$ is computed using the stored value of $H_0$ and the current value of $H_1$, and the computed $M_R$ ratio value is tested against the threshold $\tau$. In an example, the threshold $\tau$ is in the range of ten to sixty with a lower threshold being more sensitive to voice. Decision block 630 tests the AGC magnitude level to determine if it decreasing. A decreasing AGC magnitude indicates that the amplitude of the signal at the input is increasing, which can be an indicator of voice activity in the input signal. Decision block 640 tests a count of zero crossings (numZC) to determine if the count is less than a threshold Z_Th. To help discern between noise and voice, a characteristic of noise is used. If noise is at the input, the input signal jumps above and below a zero reference much more often than a voice signal (more zero crossings). The decision test in decision block 640 exploits this characteristic. If any of the decisions in blocks 620, 630 and 640 are true, then VAD is active (voice activity is present in the input signal) and processing proceeds to the compute block 610. If the decision blocks 620, 630 and 640 are all false, then two additional decision blocks 650 and 660 are processed. In decision block 650, the process 600 tests the AGC level to see if it is constant for a time period, such as 5 ms. If true, then NVD is active indicating no voice was detected, resulting in the NVD exit and the state Interim A 670 becoming active. If the test in decision block 650 is false, then processing proceeds to the final decision block 660 where the zero crossing activity ZC is tested. If the test is true, this indicates noise, and NVD is active, resulting in the exit and the state Interim A 670 becoming active. Otherwise, if decision block 660 is false, processing again proceeds to the compute block 610.

In FIG. 6, an example order of steps is shown for explanation, however, in alternative embodiments the order of steps can be changed. Steps can be combined together, or performed in parallel, for example.

Figure 7:
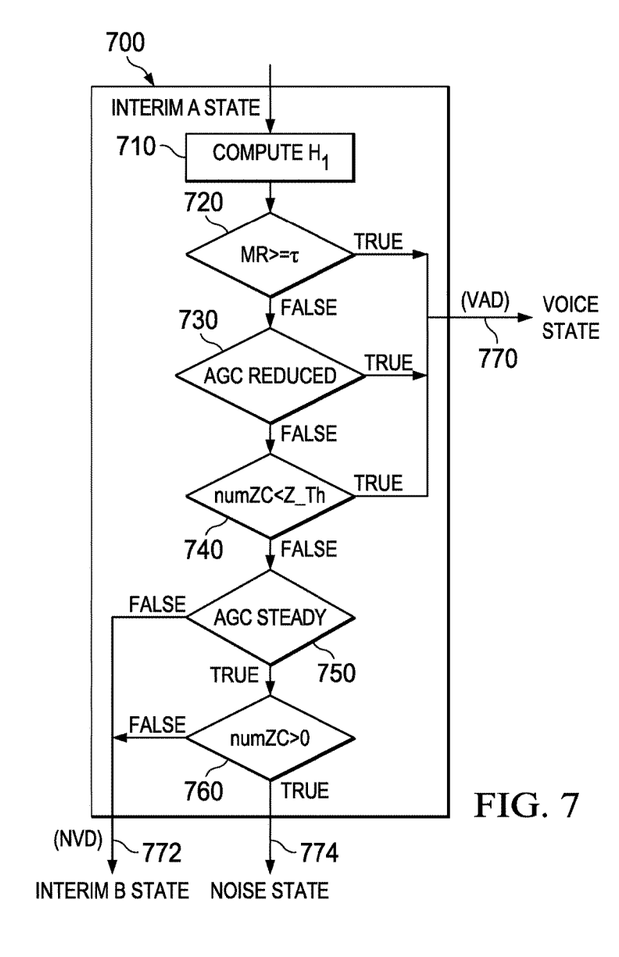
FIG. 7 is a flow chart of an Interim A State for use with the embodiments.

FIG. 7 is a flow chart of the processes performed in an Interim A state, such as 520 in FIG. 5. Flow chart 700 illustrates an example embodiment of an Interim A state 700 that contains at least a compute block 710, and five decision blocks 720, 730, 740, 750, 760 and three exits 770, 772 and 774. Compute block 710 is the entry block and is coupled to decision block 720. Decision block 720 exits state Interim A 700 to the Voice State 770 if true and continues to the decision block 730 if false. Decision block 730 exits the Interim A State 700 to the Voice State 770 if true, and continues to the decision block 740 if false. Decision block 740 exits Interim A State 700 to the Voice State 770 if true and continues to the decision block 750 if false. Decision block 750 exits Interim A State 700 to the Interim B State 772 if false, and continues to the decision block 760 if true. Decision block 760 exits Interim A State 700 to the Interim B State 772 if false and exits Interim A State 700 to the Noise State 774 if true.

In operation, the process begins in compute block 710 where $H_1$ of EQ. 4 is computed and stored. In the next step 720, the mean ratio $M_R$ is computed using the stored value of $H_0$ and the current value of $H_1$. In decision block 720, the $M_R$ value is tested against the threshold $\tau$. If the $M_R$ value is not greater than $\tau$, the decision is false and the process transitions to decision block 730. In decision block 730, the AGC level is tested to see if it decreasing. A decreasing AGC magnitude indicates that the amplitude of the signal is increasing, which can be a sign of voice activity in the input signal. Decision block 740 tests to see if the count of zero crossings (numZC) is less than a threshold Z_Th. If any of the decisions in blocks 720, 730 and 740 are true, then VAD is active and the process flows to the Voice State 770.

If the decision blocks 720, 730 and 740 are false, then two additional decision blocks 750 and 760 are processed. Decision block 750 tests to see of AGC is steady for a time, such as 5 ms. If true, the process goes to block 760. If false, NVD is active (no voice activity is present) and the process flow exits to the Interim B State at 772. Decision block 760 tests the ZC and if true, noise is detected at the input active and the process flow exits to the Noise State 774. Otherwise, when either decision blocks 750 and 760 are false, the flow proceeds back to the Interim B State 772.

Figure 8:
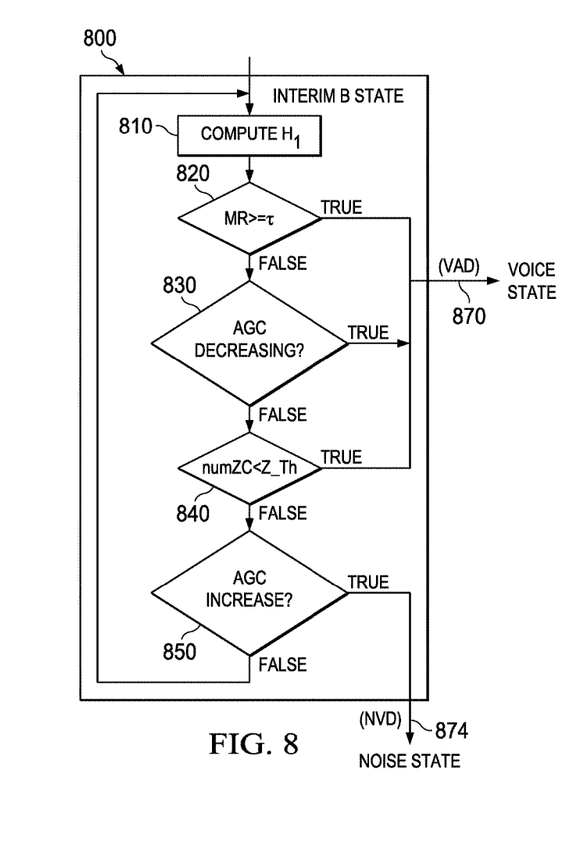
FIG. 8 is a flow chart of an Interim B State for use with the embodiments.

FIG. 8 is a flow chart of the processes performed in an example embodiment for an Interim B State such as 530 in FIG. 5. Flow chart 800 illustrates an example Interim B State that contains at least a compute block 810 and four decision blocks 820, 830, 840, 850 and two exits 870 and 874.

The process begins in compute block 810 that is coupled to decision block 820. Decision block 820 true is coupled to an exit, Voice State 870. Decision block 820 false is coupled to decision block 830. Decision block 830 true is coupled to the exit, Voice State 870. Decision block 830 false is coupled to decision block 840. Decision block 840 true is coupled to the exit, Voice State 870. Decision block 840 false is coupled to decision block 850. Decision block 850 true is coupled to the exit, Noise State 874. Decision 850 false is coupled to compute block 810.

In operation, the process begins at block 810 which computes and stores $H_1$ of EQ. 4 so that the mean ratio $M_R$ test in decision block 820 is updated. In decision block 820, the $M_R$ is computed with the stored value of $H_0$ and the current value of $H_1$. The value of $M_R$ is tested if greater than the threshold $\tau$ in decision block 820. If false, then the process transitions to decision block 830. The AGC magnitude level is tested in decision block 830 to see if it decreasing. As described hereinabove, a decreasing AGC indicates that the amplitude of the signal is increasing, which can be an indicator of voice. If decision block 830 is false, then the process transitions to decision block 840. In decision block 840, the count of zero crossings (numZC) tested to determine if the count is less than a threshold Z_Th. If any of the decisions in blocks 820, 830 and 840 are true, then VAD is active and the flow exits to the Voice State (VAD) 870. If the decision blocks 820, 830 and 840 are false, then decision block 850 is processed. Decision block 850 tests to see if AGC is steady for a time, such as 5 ms. If this decision is true, then NVD is active and flow exits to the Noise State 874. Otherwise, if decision block 850 is false, the flow proceeds to the compute block 810. As described hereinabove with respect to the other flow charts, the process illustrated in FIG. 8 shows an example order of steps for explanation. However, in alternative embodiments, the order of steps can be different and these form additional embodiments that are contemplated.

Figure 9:
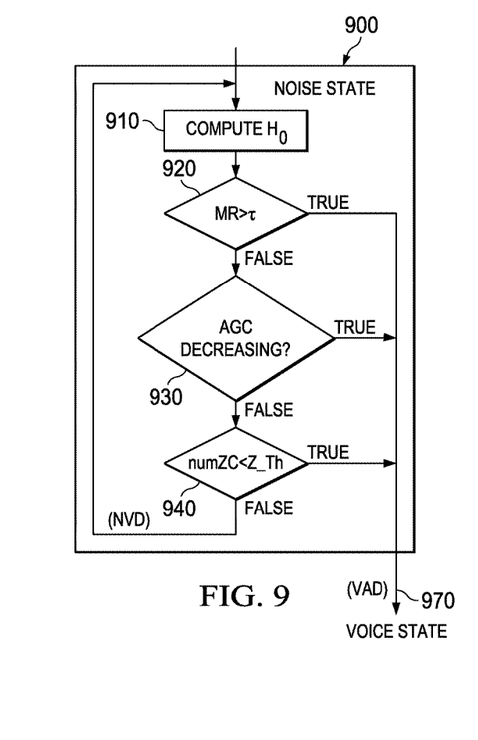
FIG. 9 is a flow chart of a Noise State for use with the embodiments.

FIG. 9 is a flow chart of the processes performed in a Noise State such as 540 in FIG. 5. Flow chart 900 is an example embodiment of a Noise State that contains at least a compute block 910 and three decision blocks 920, 930 940 and an exit 970.

The Noise State process 900 begins at compute block 910 which is coupled to decision block 920. Decision block 920 true is coupled to an exit, Voice State 970. Decision block 920 false is coupled to decision block 930. Decision block 930 true is coupled to an exit, Voice State 970. Decision block 930 false is coupled to decision block 940. Decision block 940 true is coupled to an exit, Voice State 970. Decision 940 false is coupled to compute block 910.

In operation, compute block 910 computes the noise component $H_0$ of EQ. 3 so that the mean ratio $M_R$ test in decision block 920 is updated. In decision block 920, the $M_R$ is computed using the stored value of $H_1$ and the current value of $H_0$. The value of $M_R$ is tested to see if it is greater than the threshold $\tau$ in decision block 920. If false, then the AGC level is tested to see if it decreasing in decision block 930. A decreasing AGC indicates that the amplitude of the signal is increasing which can be a sign of voice at the input. If block 930 is false, then decision block 940 tests to see if the count of zero crossings (numZC) is less than a threshold Z_Th. If any of the decisions in blocks 920, 930 and 940 are true, then VAD is active and the flow exits to the Voice State 970. Otherwise, if all decision blocks 920, 930 and 940 are false, then NVD is active and flow to proceeds to the entry point, compute block 910.

The state machine of FIG. 5, and the detailed process flow charts for each of the states shown in FIGS. 6-9, can be implemented in different ways and the implementation alternatives form additional alternative embodiments. For example, the MCU VAD ALGORITHM 350 in FIG. 3 can be implemented as an MCU performing the state machine of FIG. 5 using program instructions that are executed to perform the state transitions. Alternatively, a dedicated hardware solution can be formed in an integrated circuit using registers and logic elements to form the state machine. Application specific integrated circuits (ASICs), complex logic programmable devices (CPLDs), field programmable gate arrays (FPGAs) and other user definable and partially user definable devices can be used to implement the VAD algorithms using the state machine in FIG. 5. A custom integrated circuit including analog and digital components for forming a highly integrated solution can be used to implement the embodiments. Analog front end (AFE) integrated circuit devices coupled to one or more separate digital integrated circuits can be used to form the embodiments. Software running on a variety of commercially available processor devices such as microprocessors, microcontrollers, digital signal processors (DSPs), mixed signal processors (MSPs), reduced instruction set (RISC) processors or cores, advanced RISC machine (ARM) cores, and central processor units (CPUs) can be used to implement the VAD algorithms.

Modifications are possible in the described embodiments, and other embodiments are possible within the scope of the claims.

What is claimed is:

1. A method of detecting voice activity, the method comprising:
    sampling a first input signal to form noise samples, the first input signal containing noise;
    determining a first value as an inverse covariance of the noise samples;
    sampling a second input signal to form signal samples;
    determining a second value as a covariance of the signal samples;
    computing a log likelihood ratio of the second value to the first value;
    comparing the log likelihood ratio to a threshold value; and
    responsive to the comparing, indicating whether the voice activity is detected in the second input signal.

2. A method of detecting voice activity, the method comprising:
    sampling a first input signal to form noise samples, the first input signal containing noise;
    computing a first value as a mean amplitude value of the noise samples;
    sampling a second input signal to form signal samples;
    computing a second value as a mean amplitude value of the signal samples;
    computing a ratio of the second value to the first value;
    comparing the ratio to a threshold value; and
    responsive to the comparing, indicating whether the voice activity is detected in the second input signal.

3. The method of claim 2, in which the comparing determines whether the ratio is greater than the threshold value.

4. The method of claim 2, in which the indicating comprises outputting a signal indicating whether the voice activity is detected.

5. The method of claim 2, in which the comparing determines whether the ratio is less than the threshold value.

6. The method of claim 2, further comprising testing a gain magnitude of an automatic gain control applied to the first input signal.

7. The method of claim 6, further comprising determining whether the gain magnitude is decreasing, and indicating whether the voice activity is detected responsive to the determining.

8. The method of claim 2, further comprising determining a number of zero crossings by measuring a number of times the first input signal crosses a zero reference voltage over a time period.

9. The method of claim 8, further comprising comparing the number of zero crossings to a zero crossings threshold, and indicating that the voice activity is detected if the number of zero crossings is below the zero crossings threshold.

10. A method of detecting voice in a first input signal, the method comprising:
    in a noise state, sampling a second input signal to form noise samples, and computing a noise value as a covariance matrix of the noise samples, the second input signal containing noise and no voice;
    in the noise state, sampling the first input signal to form first signal samples, and computing a first voice value from the first signal samples;
    in the noise state, detecting potential voice activity in the first signal samples;
    responsive to the detecting, transitioning to a voice state;
    in the voice state, sampling the first input signal to form second signal samples, and computing a second voice value as a covariance matrix of the second signal samples;
    in the voice state, computing a first ratio as a log likelihood ratio of the second voice value to the noise value;
    in the voice state, if the first ratio exceeds a threshold, indicating a voice activity detection, and remaining in the voice state;
    in the voice state, if the first ratio does not exceed the threshold, transitioning to an interim state;
    in the interim state, sampling the first input signal to form third signal samples, and computing a third voice value from the third signal samples;

in the interim state, computing a second ratio of the third voice value to the noise value;

in the interim state, if the second ratio exceeds the threshold, transitioning to the voice state; and in the interim state, if the second ratio does not exceed the threshold, transitioning to the noise state.

11. A method of detecting voice in a first input signal, the method comprising:

in a noise state, sampling a second input signal to form noise samples, and computing a noise value as a mean of amplitude of the noise samples, the second input signal containing noise and no voice;

in the noise state, sampling the first input signal to form first signal samples, and computing a first voice value from the first signal samples;

in the noise state, detecting potential voice activity in the first signal samples;

responsive to the detecting, transitioning to a voice state;

in the voice state, sampling the first input signal to form second signal samples, and computing a second voice value as a mean of amplitude of the second signal samples;

in the voice state, computing a first ratio of the second voice value to the noise value;

in the voice state, if the first ratio exceeds a threshold, indicating a voice activity detection, and remaining in the voice state;

in the voice state, if the first ratio does not exceed the threshold, transitioning to an interim state;

in the interim state, sampling the first input signal to form third signal samples, and computing a third voice value from the third signal samples;

in the interim state, computing a second ratio of the third voice value to the noise value;

in the interim state, if the second ratio exceeds the threshold, transitioning to the voice state; and in the interim state, if the second ratio does not exceed the threshold, transitioning to the noise state.

12. The method of claim 11, in which the interim state is a first interim state, and the method further comprises transitioning to a second interim state if a number of zero crossings in the third signal samples is greater than a zero crossings threshold.

13. The method of claim 11, in which the interim state is a first interim state, and the method further comprises transitioning to a second interim state if an automatic gain applied to the first input signal is constant for more than a particular time period.

14. Apparatus, comprising:

an input terminal;

an analog front end having an analog input coupled to the input terminal, and having an automatic gain control input and a digital output, the analog front end configured to: convert analog signals at the analog input into digital signals at the digital output, responsive to a signal at the automatic gain control input;

a filter bank having a sample input coupled to the digital output, and having filter outputs; and circuitry coupled to the filter outputs and configured to:

in a noise state: compute a noise value as a covariance matrix of first samples from the input terminal, the first samples containing noise and no voice; and compute a signal value as a covariance matrix of second samples from the input terminal;

in the noise state, compute a log likelihood ratio of the signal value to the noise value;

in the noise state, transition to a voice state if the log likelihood ratio exceeds a threshold;

in the voice state, update the signal value based on third samples from the input terminal, update the log likelihood ratio based on the updated signal value, and transition to an interim state if the updated &g likelihood ratio is less than the threshold; and in the interim state, update the signal value based on fourth samples from the input terminal, update the log likelihood ratio based on the updated signal value, transition to the noise state if the updated log likelihood ratio is less than the threshold, and transition to the noise state if a magnitude of the signal at the automatic gain control input is increasing.

15. The apparatus of claim 14, in which the circuitry is programmable to execute instructions.

16. The apparatus of claim 14, further comprising one or more zero crossing detectors.

17. The apparatus of claim 14, in which at least one of the analog front end or the circuitry is implemented as one or more portions of an integrated circuit.

18. The method of claim 1, in which the comparing determines whether the log likelihood ratio is greater than the threshold value.

19. The method of claim 1, in which the indicating comprises outputting a signal indicating whether the voice activity is detected.

20. The method of claim 1, in which the comparing determines whether the log likelihood ratio is less than the threshold value.

21. The method of claim 1, further comprising testing a gain magnitude of an automatic gain control applied to the first input signal.

22. The method of claim 21, further comprising determining whether the gain magnitude is decreasing, and indicating whether the voice activity is detected responsive to the determining.

23. The method of claim 1, further comprising determining a number of zero crossings by measuring a number of times the first input signal crosses a zero reference voltage over a time period.

24. The method of claim 23, further comprising comparing the number of zero crossings to a zero crossings threshold, and indicating that the voice activity is detected if the number of zero crossings is below the zero crossings threshold.

25. The method of claim 10, in which the interim state is a first interim state, and the method further comprises transitioning to a second interim state if a number of zero crossings in the third signal samples is greater than a zero crossings threshold.

26. The method of claim 10, in which the interim state is a first interim state, and the method further comprises transitioning to a second interim state if an automatic gain applied to the first input signal is constant for more than a particular time period.

* * * * *